(12) United States Patent
He

(10) Patent No.: US 11,436,663 B2
(45) Date of Patent: Sep. 6, 2022

(54) ORDER PROCESSING SYSTEM, METHOD, DEVICE AND STORAGE MEDIUM

(71) Applicant: TENCENT TECHNOLOGY (SHENZHEN) COMPANY LIMITED, Guangdong (CN)

(72) Inventor: Chang He, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 707 days.

(21) Appl. No.: 16/337,703

(22) PCT Filed: Dec. 5, 2017

(86) PCT No.: PCT/CN2017/114532
§ 371 (c)(1),
(2) Date: Mar. 28, 2019

(87) PCT Pub. No.: WO2018/113510
PCT Pub. Date: Jun. 28, 2018

(65) Prior Publication Data
US 2020/0034916 A1   Jan. 30, 2020

(30) Foreign Application Priority Data

Dec. 21, 2016 (CN) .......................... 201611192687.9

(51) Int. Cl.
*G06Q 30/06* (2012.01)
(52) U.S. Cl.
CPC ................................ *G06Q 30/0635* (2013.01)

(58) Field of Classification Search
None
See application file for complete search history.

(56) References Cited

U.S. PATENT DOCUMENTS

| 2001/0021921 A1 | 9/2001 | Kan et al. | |
| 2004/0158494 A1* | 8/2004 | Suthar | G06Q 30/06 705/15 |

FOREIGN PATENT DOCUMENTS

| CN | 100533357 C | * 8/2009 | ............ G06F 3/023 |
| CN | 105184698 A | 12/2015 | |
| CN | 105892809 A | 8/2016 | |
| CN | 106033573 A | 10/2016 | |
| CN | 106779951 A | 5/2017 | |

(Continued)

OTHER PUBLICATIONS

English translation Zeng reference (Year: 2009).*

(Continued)

*Primary Examiner* — Michelle T Kringen
(74) *Attorney, Agent, or Firm* — Sughrue Mion, PLLC

(57) ABSTRACT

An order processing system and method includes sending, to a backend, an order queue comprising at least one order identifying a delivery object associated with a client and comprising at least one ordered item, receiving, from the backend, an updated preparing status of each target ordered item in the order queue, updating the order queue based on the preparing status of each target ordered item, determining the preparing status of each target ordered item in the target order based on the updated order queue, and sending the preparing status of each ordered item in the order to the client associated with the delivery object of the order.

16 Claims, 10 Drawing Sheets

(56) References Cited

FOREIGN PATENT DOCUMENTS

| JP | 2012014567 A | * | 1/2012 |
| KR | 20100042508 A | * | 4/2010 |

OTHER PUBLICATIONS

Tiantian Liu, Xiaoqiang Wu and Yaohua Lian, "Design and construction of sunshine kitchen system based on cloud computing and video data analysis," 2015 4th International Conference on Computer Science and Network Technology (ICCSNT), 2015, pp. 211-215, doi: 10.1109/ICCSNT.2015.7490738 (Year: 2015).*
International Search Report of PCT/CN2017/114532 dated Mar. 6, 2018.

* cited by examiner

ORDER PROCESSING SYSTEM, METHOD, DEVICE AND STORAGE MEDIUM

CROSS-REFERENCE TO RELATED APPLICATIONS

This application is a U.S. national stage application under 35 U.S.C. § 371 of International Patent Application No. PCT/CN2017/114532 filed on Dec. 5, 2017, which claims priority from Chinese Patent Application No. 201611192687.9, filed in the Chinese Patent Office on Dec. 21, 2016 and entitled "ORDER PROCESSING SYSTEM AND METHOD," the disclosures of which are incorporated herein by reference in their entireties.

BACKGROUND

1. Field

Methods and apparatuses consistent with embodiments relate to the field of order data processing technologies, and specifically, to an order processing system and an order processing method.

2. Description of Related Art

There may be multiple different types of orders, for example, a bank queuing service is a type of order, and a menu of dishes ordered in a restaurant is also a type of order. Generally, an order may include at least one ordered item, for example, multiple dishes included in a menu. A user initiates an order, an order receiver prepares and processes each ordered item included in the order, and delivers the ordered item to the user when the processes for the ordered item have been completed.

Some orders may have relatively high priority on time. Accordingly, there may be a need to inform the user of a status of an order to relieve anxiety. To solve this problem, an order receiver receives orders, within a period of time, initiated by multiple users, and sends feedback of preparing statuses of the orders to the users in prompt manner, so that the users learn of preparing progresses of the orders, thereby reducing anxiety of the user during the waiting period and improving the transmission of information regarding time consumption for order preparing.

SUMMARY

According to an embodiment, there is provided an order processing system including a client, a central site and a backend. The order processing system further includes the central site configured to send, to the backend, an order queue comprising at least one order identifying a delivery object associated with the client, the order comprising at least one ordered item, the backend configured to prompt a preparing object to prepare the at least one ordered item in the order queue, and in response to an update operation performed by the preparing object on a preparing status of a target ordered item in the order queue, send an updated preparing status of each target ordered item to the central site, the central site further configured to update the order queue according to the updated preparing status of each target ordered item, determine, according to the updated order queue, the preparing status of each target ordered item and send the preparing status of each ordered item to the client associated with the delivery object of the at least one order, and the client configured to receive, from the backend, the updated preparing status of each ordered item and display the received preparing status of the ordered item.

According to another embodiment, there is provided an order processing method for a central site, the method including sending, to a backend, an order queue comprising at least one order identifying a delivery object associated with a client, the order comprising at least one ordered item, receiving an updated preparing status of a target ordered item in the order queue sent by the backend, updating the order queue based on the preparing status of each target ordered item, determining the preparing status of each target ordered item in the target order based on the updated order queue, and sending the preparing status of each ordered item in the order to the client associated with the delivery object of the order.

According to another embodiment, there is provided a non-transitory computer-readable storage medium storing program instructions that cause at least one processor to send, to a backend, an order queue comprising at least one order identifying a delivery object associated with a client, the order comprising at least one ordered item, receive an updated preparing status of a target ordered item in the order queue sent by the backend, update the order queue based on the preparing status of each target ordered item, determine the preparing status of each target ordered item in the target order based on the updated order queue, and send the preparing status of each ordered item in the order to the client associated with the delivery object of the order.

DESCRIPTION OF EMBODIMENTS

The following describes the technical solutions in the embodiments of the present application with reference to the accompanying drawings in the embodiments of the present application.

Figure 1:
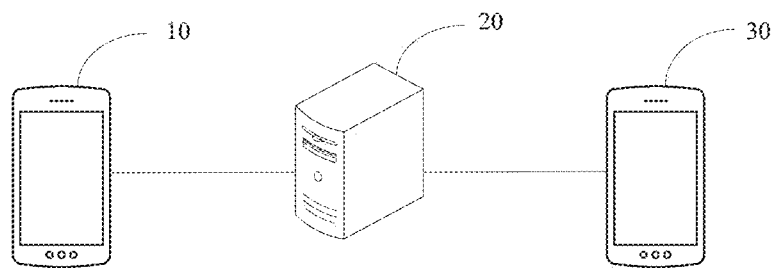
FIG. 1 is a structural block diagram of an order processing system according to an embodiment.

FIG. 1 is a structural block diagram of an order processing system according to an embodiment. Referring to FIG. 1, the order processing system 1 may include a client 10, a central site 20, and a backend 30.

The client 10 may be a user equipment, for example, a mobile phone, a tablet computer, or a PC, used by the user. In this embodiment, an application may be loaded or launched on the client 10, to implement communication with the central site 20. The client 10 may be used by the user to initiate an order, and send the order to the central site 20. The client 10 may further display a preparing status of each ordered item in the order.

Figure 2:
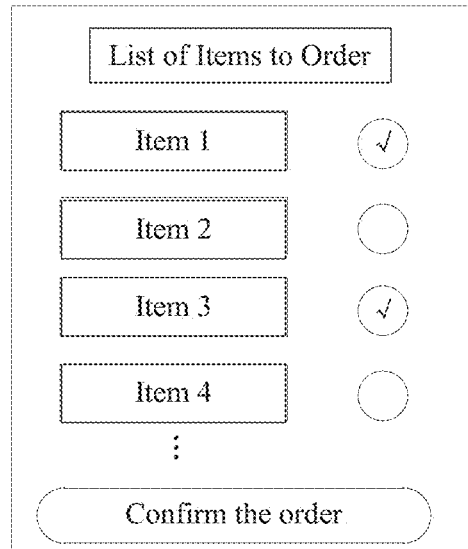
FIG. 2 is a schematic diagram of an interface for delivering an order according to an embodiment.

FIG. 2 is a schematic diagram of an interface for delivering an order. The loaded application may display all potential items to be ordered, and then the user may select one or more items to be ordered therein. Finally, an order may include one or more selected items, and the order is sent to the central site 20.

Figure 3:
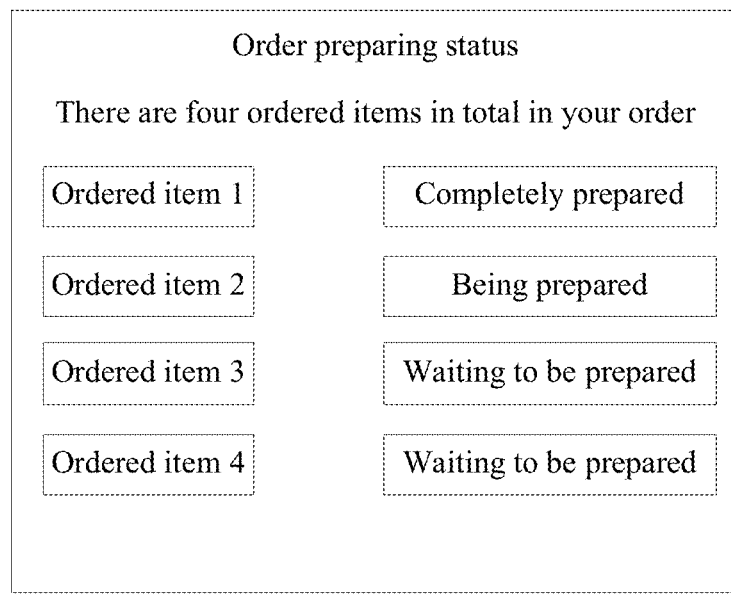
FIG. 3 is a schematic diagram of displaying a preparing status of an order according to an embodiment.

FIG. 3 is a schematic diagram of displaying a preparing status of an order. The user may learn of a preparing status of each ordered item in the initiated order in real time by using an interface of the client 10.

In another aspect, there may be one or more clients 10. For example, a distributor of the ordered item equips each user that sends an order with one client 10. Each user that sends an order may use a mobile phone, or the like, that the user carries as a client. In addition, the distributor of the ordered item may provide one or more client to be used by all users.

The central site 20 may be a server group including one or more servers or databases. The central site 20 may communicate with the client 10 and the backend 30. The central site 20 adds to an order queue, an order sent by the client 10, and then sends the order queue to the backend 30. The central site 20 receives an updated preparing status of an ordered item from the backend 30 and updates the order queue stored in the central site 20. Subsequently, the central site 20 sends the updated preparing status of each ordered item in the order to the client 10.

The backend 30 may be a mobile phone, a tablet computer, a PC, or the like. The backend 30 displays the order queue, to prompt a preparing object to prepare each ordered item in the order queue. In addition, after the preparing object starts to prepare the ordered item, the preparing object may update a preparing status of a corresponding ordered item by using the backend 30, and the backend 30 sends the updated preparing status of the ordered item to the central site 20.

In addition, there may be one or more backends 30, in which each preparing object is equipped with at least one backend.

Figure 4:
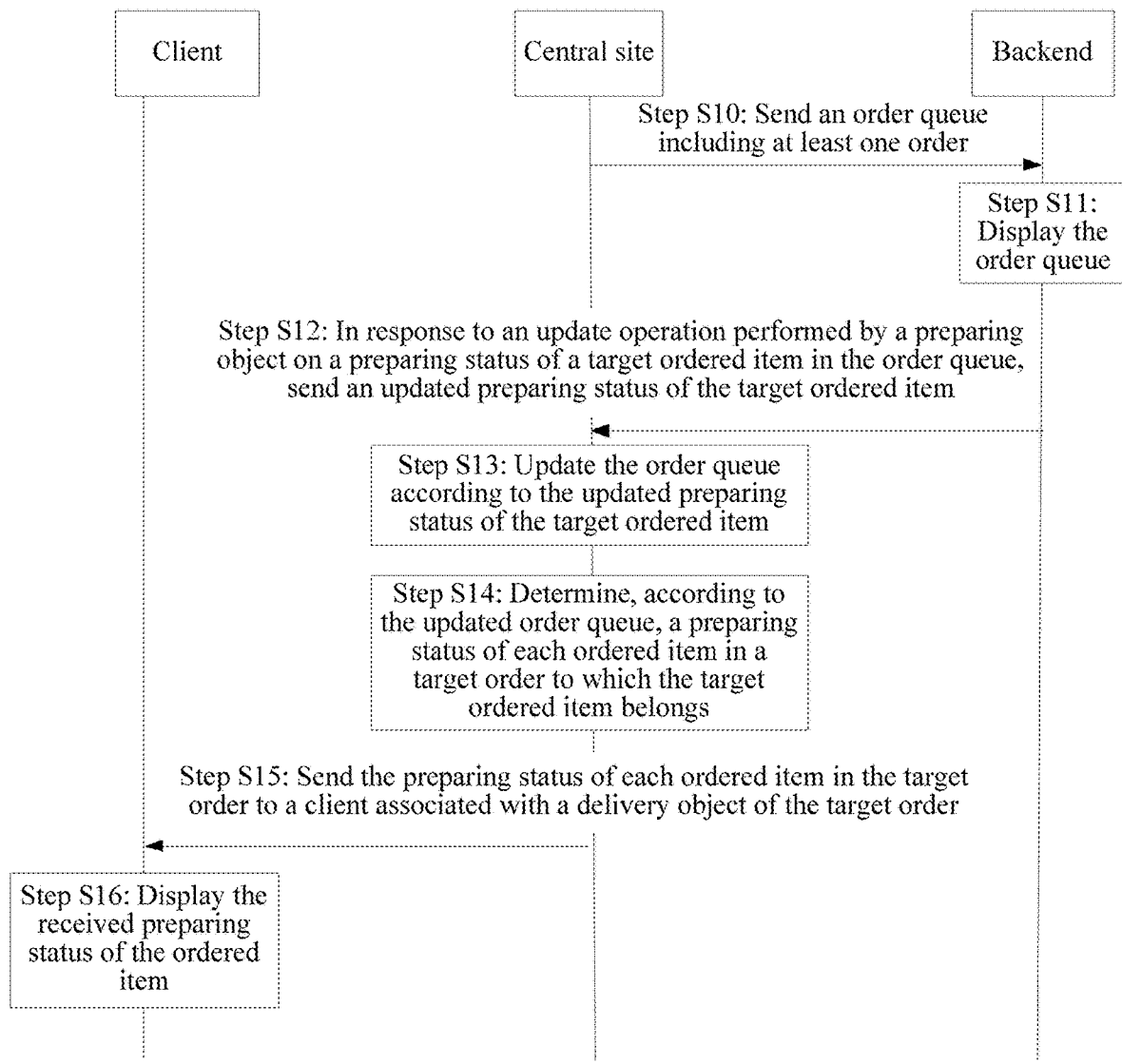
FIG. 4 is a flowchart of an order processing method according to an embodiment.

FIG. 4 shows a flowchart of an order processing method according to an embodiment. Referring to FIG. 4. In step S10, the central site sends, to the backend, an order queue including at least one order. The order identifies a delivery object, and the delivery object is associated with a client. Each order includes at least one ordered item. The delivery object of the order may include an identifier of a user that initiates the order, or another object associated with another user that initiates the order. The delivery object may be a workstation number or an address of the user that initiates the order. For example, when the user orders dishes in a restaurant, a delivery object may be a dining table number of the user that orders dishes.

The delivery object of the order is associated with a client. It may be set in such a manner that each delivery object is associated with a unique client, or different delivery objects may be associated with the same client. For example, when the user orders dishes in a restaurant, each dining table may be equipped with one client, and the client may be provided by the restaurant or may be carried by the dining user. In another aspect, the restaurant may provide a centralized client to be displayed in a dining hall, and each dining table is associated with the centralized client.

In another aspect of an embodiment, the order queue of the central site may be manually entered by staff of a distributor of the ordered item, or the order may be obtained by the client and transmitted to the central site, and the central site may organize the received orders into the order queue based on a sequence of order reception time.

In step S11, upon receiving the order queue including at least one order from the central site, the backend displays the order queue. The backend may display the order queue delivered by the central site, to prompt a preparing object to prepare an ordered item in the order queue.

Generally, the preparing object sequentially prepares ordered items in the order queue based on rankings of the ordered items in the order queue. However, the preparing object may prepare the ordered items in another sequence based on different ranking arrangements.

It should be noted that, according to different types of ordered items, manners of preparing the ordered items may be different. For example, if an ordered item is a dish, a preparing manner may be cooking to prepare the dish. In another example, if an ordered item is a software product, a corresponding preparing manner may be programming or testing the software product. Further, preparing of an ordered item may not be limited to physical processing.

In step S12, in response to an update operation performed by a preparing object on a preparing status of a target ordered item in the order queue, the backend sends an updated preparing status of the target ordered item to the central site. Here, the target ordered item may be any ordered item that the preparing object decides to prepare in view of the order queue. For example, a chef may decide to prepare an ordered item among many ordered items looking at the received order queue. The ordered item that the chef chooses among many ordered items may be the target order. In addition, the target order may include one or more ordered items.

Specifically, in a process in which the preparing object prepares the ordered item in the order queue, a preparing status of the ordered item may be changed. Each time when the preparing status of the target ordered item is changed, the preparing object updates the corresponding preparing status of the target ordered item in an order list on the backend. Further, the backend sends the updated preparing status of the target ordered item to the central site, so that the central site updates the order queue.

Referring to the following Table 1 and Table 2, examples of preparing statuses of dishes are shown.

TABLE 1

| Delivery object of a menu | Chef | Dish | Preparing status |
|---|---|---|---|
| Xiao Ming | Li Dazui | Beef steak | Being prepared |
| Xiao Ming | Li Dazui | Yangzhou fried rice | Waiting to be prepared |
| Xiao Ming | Li Dazui | Water spinach | Waiting to be prepared |
| Xiao Hong | Li Dazui | Scrambled eggs with tomatoes | Waiting to be prepared |
| Xiao Hong | Li Dazui | Sandwich | Waiting to be prepared |

TABLE 2

| Delivery object of a menu | Chef | Dish | Preparing status |
| --- | --- | --- | --- |
| Xiao Ming | Li Dazui | Beef steak | Completely prepared |
| Xiao Ming | Li Dazui | Yangzhou fried rice | Being prepared |
| Xiao Ming | Li Dazui | Water spinach | Waiting to be prepared |
| Xiao Hong | Li Dazui | Scrambled eggs with tomatoes | Waiting to be prepared |
| Xiao Hong | Li Dazui | Sandwich | Waiting to be prepared |

A menu list stored in the central site at a specific moment is shown in Table 1. The preparing status of "beef steak" in the menu is "being prepared". The preparing statuses of remaining dishes are all "waiting to be prepared."

When preparing for the "beef steak" is complete, the chef updates, on the backend, the preparing status of "beef steak" to "completely prepared," and starts to prepare the next dish "Yangzhou fried rice" and updates, on the backend, the preparing status of "Yangzhou fried rice" to "being prepared." The backend sends the updated preparing status "completely prepared" of "beef steak" and the updated preparing status "being prepared" of "Yangzhou fried rice" to the central site, and the central site updates the menu list stored in the central site. The updated menu list is shown in Table 2.

Additionally, a manner in which the backend sends the updated preparing status of the target ordered item to the central site may include sending only the updated preparing status of the target ordered item to the central site and sending, to the central site, the order queue including the updated preparing status of the target ordered item.

In step S13, the central site updates the order queue according to the updated preparing status of the target ordered item received from the backend.

Specifically, to ensure consistency between an order queue in the central site and the order queue in the backend, after the backend updates the preparing status of the target ordered item, the central site updates the order queue according to the updated preparing status of the target ordered item.

Further, when different information is sent by the backend, the update manners used by the central site may also be different. For example, if the backend sends only the updated preparing status of the target ordered item to the central site, the central site may update, according to the updated preparing status of the target ordered item, a preparing status of the target ordered item in the order queue stored by the central site, and preparing statuses of remaining ordered items remain unchanged.

If the backend sends, to the central site, the order queue including the updated preparing status of the target ordered item, the central site may directly replace the order queue stored by the central site with the received order queue. The central site may compare the received order queue with the order queue stored by the central site, to determine an ordered item having a different preparing status, so as to update, according to the preparing status of the ordered item in the received order queue, the corresponding preparing status of the ordered item in the order queue stored by the central site.

In step S14, the central site determines, according to the updated order queue, the preparing status of each ordered item in the target order to which the target ordered item belongs.

Specifically, after the target ordered item is determined, an order to which the target ordered item belongs may be determined by using the order queue, and used as the target order. Therefore, the preparing status of each ordered item in the target order may be determined in the updated order queue.

In step S15, the central site sends the preparing status of each ordered item in the target order to a client associated with a delivery object of the target order.

Specifically, after determining the preparing status of each ordered item in the target order, the central site may directly send the determined preparing status to the client associated with the delivery object of the target order. In addition, the central site may include descriptions of the determined preparing status of each ordered item, for example, a description of the preparing status of each ordered item by using a specified description template, and then send the described preparing status of each ordered item.

Figure 5:
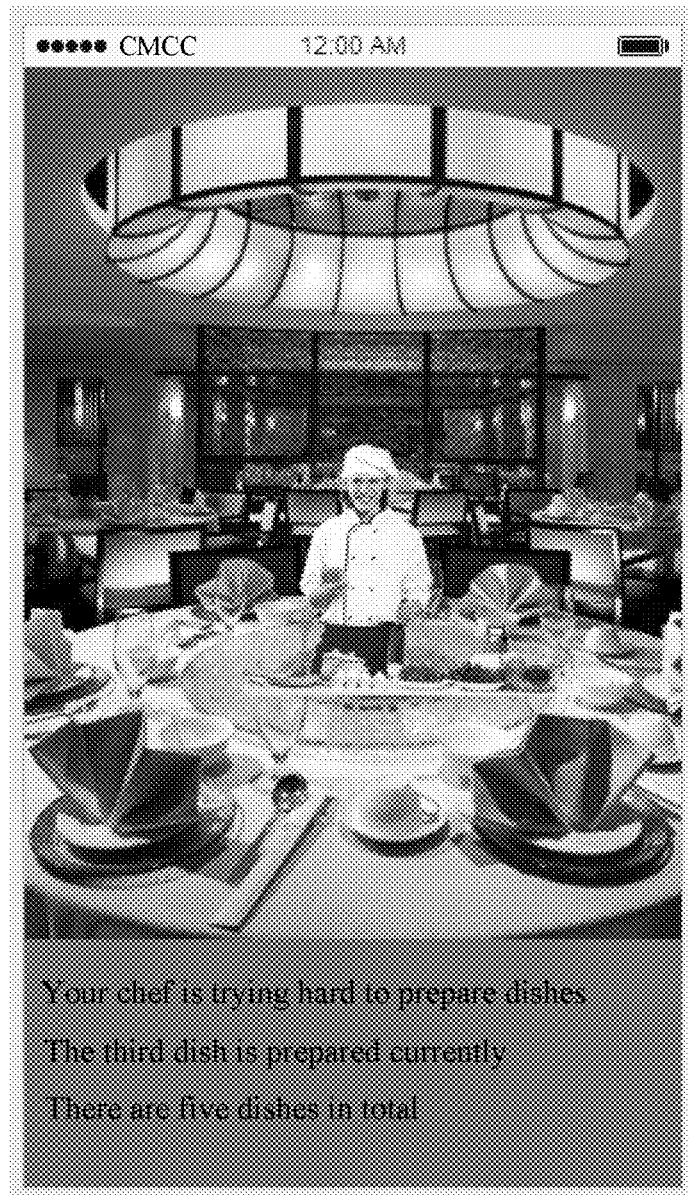
FIG. 5 is an illustration of an interface for displaying a preparing status of a menu according to an embodiment.

For example, assuming that an order submitted by the user includes five dishes, at a specific moment, the central site may determine that the first two dishes are completely prepared, and that the third dish is being prepared. The preparing status of each dish in the order may be described in words. For the description, refer to an example in FIG. 5. FIG. 5 illustrates an interface for displaying a preparing status of an order by the client. Based on the information described in the interface, the user may learn that "Your chef is trying hard to prepare dishes. The third dish is prepared currently. There are five dishes in total." In addition, another description template may be used. The description provided above is not strictly limited.

In step S16, the client displays the received preparing status of the ordered item.

According to the order processing method provided in an embodiment, a central site may send an order queue to a backend, and upon receiving the order queue, a preparing object prepares an ordered item in the order queue. In response to an update operation performed by the preparing object on a preparing status of a target ordered item in the order queue, the backend sends an updated preparing status of the target ordered item to the central site. Accordingly, the central site updates the order queue and determines, according to the updated order queue, the preparing status of each ordered item in the target order to which the target ordered item belongs, and sends the preparing status of each ordered item in the target order to a client of a delivery object associated with the target order, so that the preparing status of each ordered item in the target order can be learned by a user that initiates the target order, thereby reducing anxiety of the user during the waiting period.

The foregoing embodiment of the order processing system may include a client, a central site, and a backend.

The central site is configured to send, to the backend, an order queue including at least one order, the order identifying a delivery object, the delivery object being associated with the client, and the order including at least one ordered item.

The backend is configured to prompt a preparing object to prepare an ordered item in the order queue, and in response to an update operation performed by the preparing object on a preparing status of a target ordered item in the order queue, send an updated preparing status of the target ordered item to the central site.

The central site is further configured to update the order queue according to the updated preparing status of the target ordered item, and send the preparing status of the target ordered item to a client associated with a delivery object of the target ordered item.

The client is configured to display the received preparing status of the target ordered item.

For the central site, an order processing method in an embodiment may include sending, to a backend, an order queue including at least one order, the order identifying a delivery object, the delivery object being associated with a client, and the order including at least one ordered item; receiving an updated preparing status that is of a target ordered item included in a target order in the order queue and that is sent by the backend, and updating the order queue according to the preparing status; and sending the preparing status of the target ordered item to a client associated with a delivery object of the target ordered item.

For the client, an order processing method in an embodiment may include obtaining an order delivered by a delivery object associated with the client, the order including at least one ordered item, and the order identifying the delivery object; sending the order to a central site, so that the central site adds the order to an order queue, and sends the order queue to a backend, and the backend prompts a preparing object to prepare an ordered item in the order queue, and in response to an update operation performed by the preparing object on a preparing status of a target ordered item in the order queue, sends an updated preparing status of the target ordered item to the central site; receiving the preparing status that is of the ordered item and that is sent by the central site; and displaying the preparing status of the ordered item.

Figure 6:
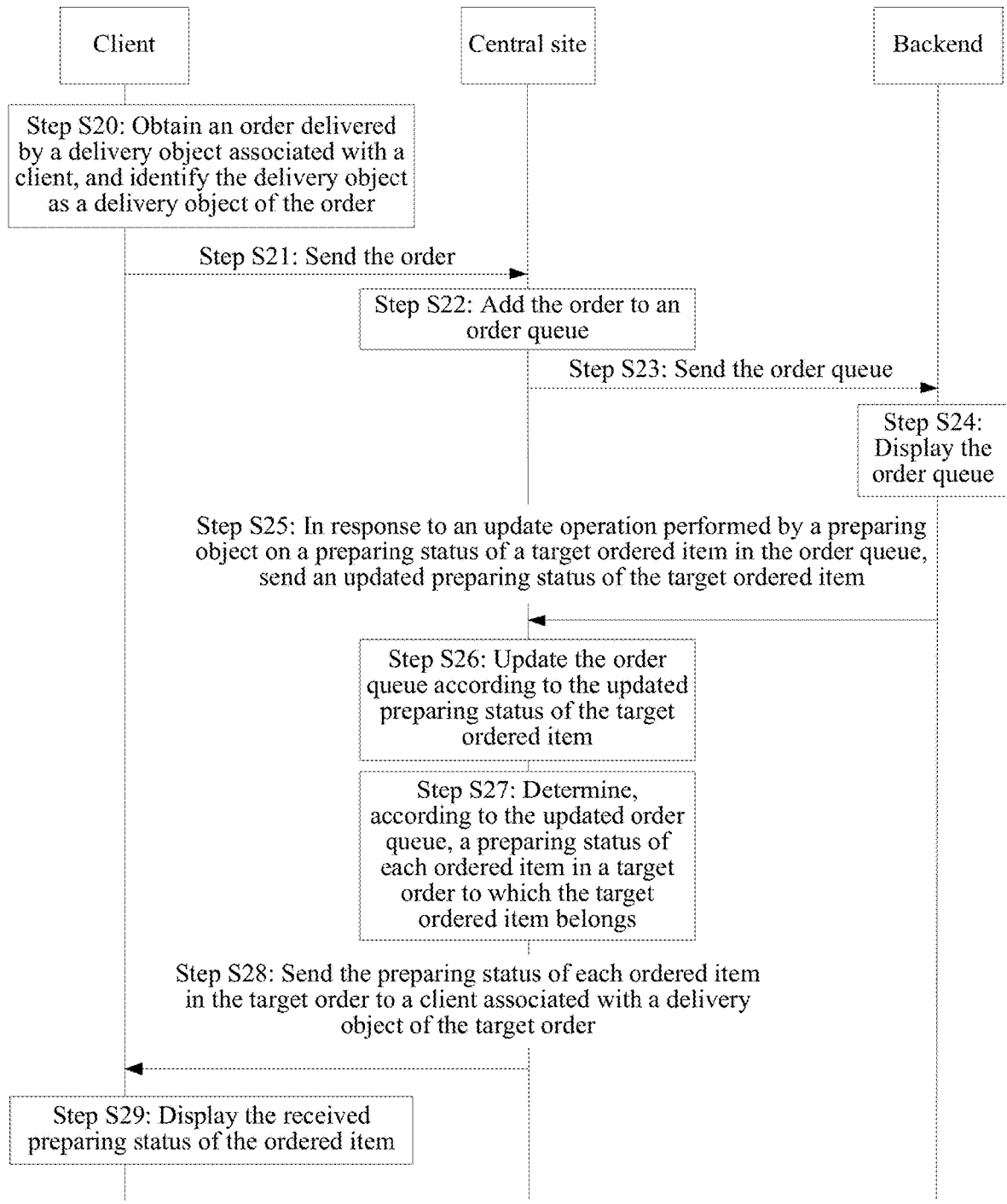
FIG. 6 is a flowchart of an order processing method according to another embodiment.

In another embodiment, an order stored by a central site may be obtained by a client and sent to the central site. The client associated with the delivery object of the target order is used as an example to describe a process of sending the target order to the central site by the client, and clients mentioned below are the clients associated with the delivery object of the target order. Referring to FIG. 6, in step S20, the client obtains an order delivered by the delivery object associated with the client, and identifies the delivery object as the delivery object of the order.

Specifically, in this embodiment, the client may obtain an order. That is, a user may generate an order by using the client.

The delivery object associated with the client may be a login user of the client, or may be an object associated in advance with the client. For example, when a user orders dishes in a restaurant, the delivery object associated with the client may be a dining table number, and the dining table number may be obtained by scanning, by the client, a figure that is set on a dining table. A client may be preconfigured for each dining table, and a relationship between a client and a dining table number of a corresponding dining table may be pre-established.

The user may select an ordered item by using the client, and an order may include the selected ordered item.

In step S21, the client sends the order to the central site.

In step S22, upon receiving the order, the central site adds the order to an order queue.

In addition, the central site may receive orders sent by different clients, and then organize the received orders into the order queue.

Further, the central site may sort the orders according to a sequence of sending time of the orders. The central site may sort the received orders in another manner. For example, each time the central site receives an order sent by a client, the central site may add the order to the stored order queue according to a specified policy.

In step S23, the central site sends the order queue to the backend.

In step S24, the backend displays the order queue.

In step S25, in response to an update operation performed by a preparing object on a preparing status of a target ordered item in the order queue, the backend sends an updated preparing status of the target ordered item to the central site.

In step S26, the central site updates the order queue according to the updated preparing status of the target ordered item.

In step S27, the central site determines, according to the updated order queue, a preparing status of each ordered item in a target order to which the target ordered item belongs.

In step S28, the central site sends the preparing status of each ordered item in the target order to a client associated with a delivery object of the target order.

In step S29, the client displays the received preparing status of the ordered item.

The steps S24 to S29 are the similar to the steps S11 to S16 in the previous embodiment as shown in FIG. 4. For a specific implementation process, refer to the foregoing descriptions.

In another embodiment, a client can further obtain an order and send the order to a central site. The central site may add the order to an order queue and send the order queue to a backend. The client obtains the order and sends the order to the central site, thereby facilitating a procedure of obtaining the order by the central site.

Figure 7:
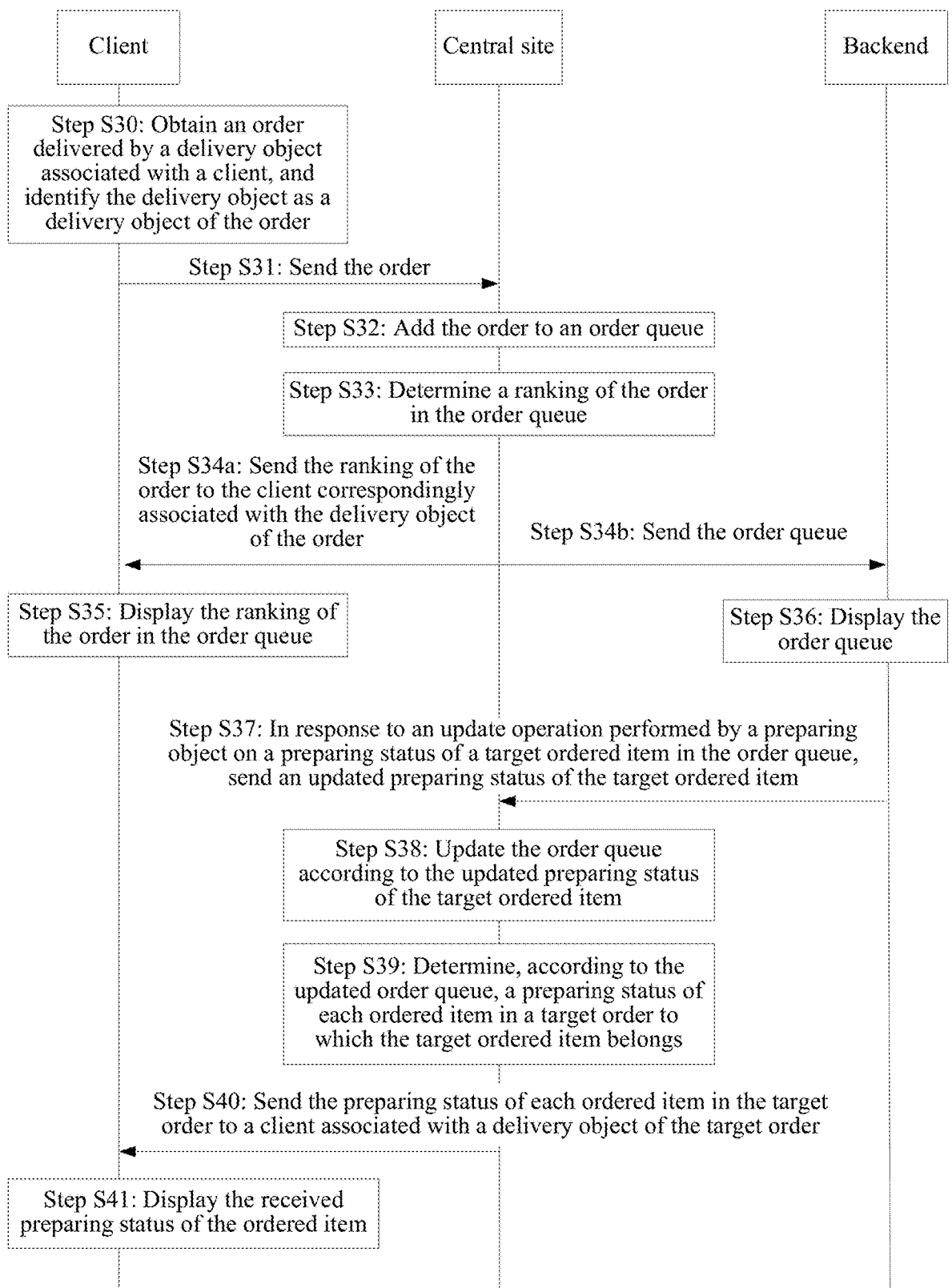
FIG. 7 is a flowchart of an order processing method according to another embodiment.

FIG. 7 discloses another flowchart of an order processing method. It may be learned through a comparison between FIG. 6 and FIG. 7 that, after the central site adds the order to the order queue, the central site may determine a ranking of the order in the order queue.

For example, in step S33, the central site determines a ranking of the order in the order queue.

The order queue is used to sequentially store orders that are received by the central site and that are not completely prepared. For an order that is received and that is completely prepared, the order may be deleted from the order queue stored by the central site, or the order may be removed from the order queue and stored in another file.

The ranking of the order in the order queue may be determined when there are multiple orders that are not completely prepared before the order, and the ranking may be sent to the client associated with the delivery object of the order.

In step S34a, the central site sends the ranking of the order to the client associated with the delivery object of the order.

Figure 8:
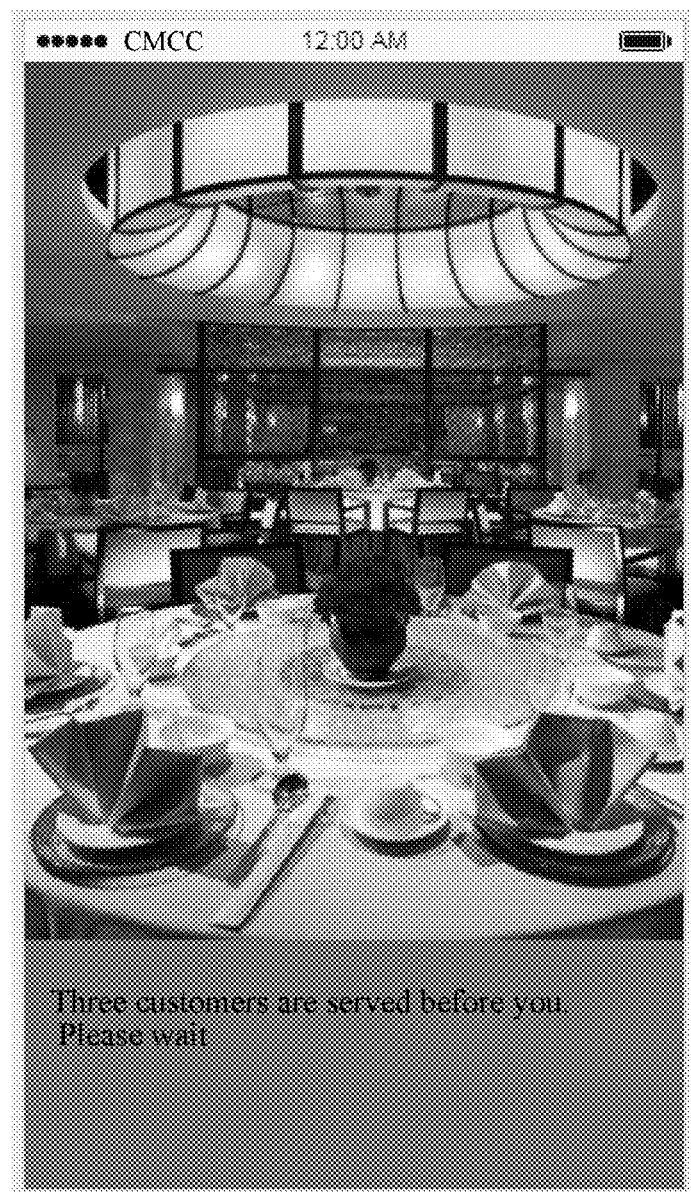
FIG. 8 is an illustration of an interface for displaying a ranking of a status of an order according to an embodiment.

Specifically, after determining the ranking of the order, the central site may describe the ranking. FIG. 8 illustrates an example of an interface for displaying a ranking of an order by the client. The user may learn from the described content that "Three customers are served before you. Please wait."

In addition, another description template may be used. This is not limited to the illustration shown in FIG. 8.

In step S34b, the central site sends the order queue to the backend.

There is no required sequence of step S34a and step S34b, and S34a and step S34b may be performed simultaneously or may be performed in any sequence.

In step S35, after receiving the ranking of the order in the order queue from the central site, the client displays the ranking of the order in the order queue to the user.

The steps S36 to S41 are the same as steps S24 to S29 in the previous embodiment as shown in FIG. 6.

In the foregoing embodiment, after determining the preparing status of each ordered item in the target order to which the target ordered item belongs, the central site may further determine whether the ordered items in the target order are all completely prepared. If all of the ordered items in the target order are completely prepared, the central site may delete the target order from the order queue, and determine a new ranking of orders in the order queue after the deletion and send the new ranking of the corresponding orders to clients associated with delivery objects of the orders. Such updates may be repeated in the central site and the central site may determine the newest ranking and send the newest ranking to the client at any time the order queue is updated.

On this basis, when a ranking of an order is changed, the user may be notified in time, thereby reducing anxiety of the user during the waiting period.

Referring to FIG. 8, the client may further display a background video image and the ranking of the order received from the central site.

The process of obtaining, by the client, a background video image may include controlling a camera disposed on the client to be enabled, and obtaining a real-time video image captured by the camera, as the background video image. In addition, the client may also obtain a prestored video image, as the background video image.

The client obtains the background video image, and then displays the ranking of the order in the background video image, so that user experience may be enhanced visually and acoustically, thereby further reducing anxiety of the user during the waiting period.

Further, a camera may be included in the backend, to record a process of preparing the ordered item by the preparing object, and the backend obtains a real-time image and sends the real-time image to the central site.

On this basis, the central site may determine that the target ordered item is the first ordered item in the target order, and as the updated preparing status of the target ordered item indicates that the target ordered item starts to be prepared, the central site may request the backend to send the real-time image to the client associated with the delivery object of the target order. The central site may also request the backend to stop sending the real-time image when the central site determines that the ordered items in the target order are all completely prepared.

In addition, when the client receives the real-time image, the client may also obtain the background video image to be displayed simultaneously with the real-time image.

As another example, a video superimposition may be performed with an augmented reality technology to display the real-time image in the background video image. This allows the user to view the process of preparing the ordered item while waiting for the order to be completely prepared. As such, the user experience may be greatly improved. As shown in FIG. 5, during waiting for all dishes in the menu, the user can appreciate a process of preparing dishes by a chef displayed in the client. The background video image may be a video captured in real time by the camera of the client.

Further, on the backend, multiple preparing objects may prepare different ordered items at the same time, so that multiple real-time images may be obtained by the backend and sent to the central site. The process of sending, by the central site, the real-time image to the client associated with the delivery object of the target order may specifically include separately sending, by the central site to the client associated with the delivery object of the target order, real-time images of processes of preparing the ordered items in the target order.

The process of superimposing, by the client, the real-time image to the background video image for display may specifically include superimposing, by the client to the background video image in parallel, the several real-time images sent by the central site, and switching between the several real-time images when a real-time image switching instruction of a user is received.

Figure 9:
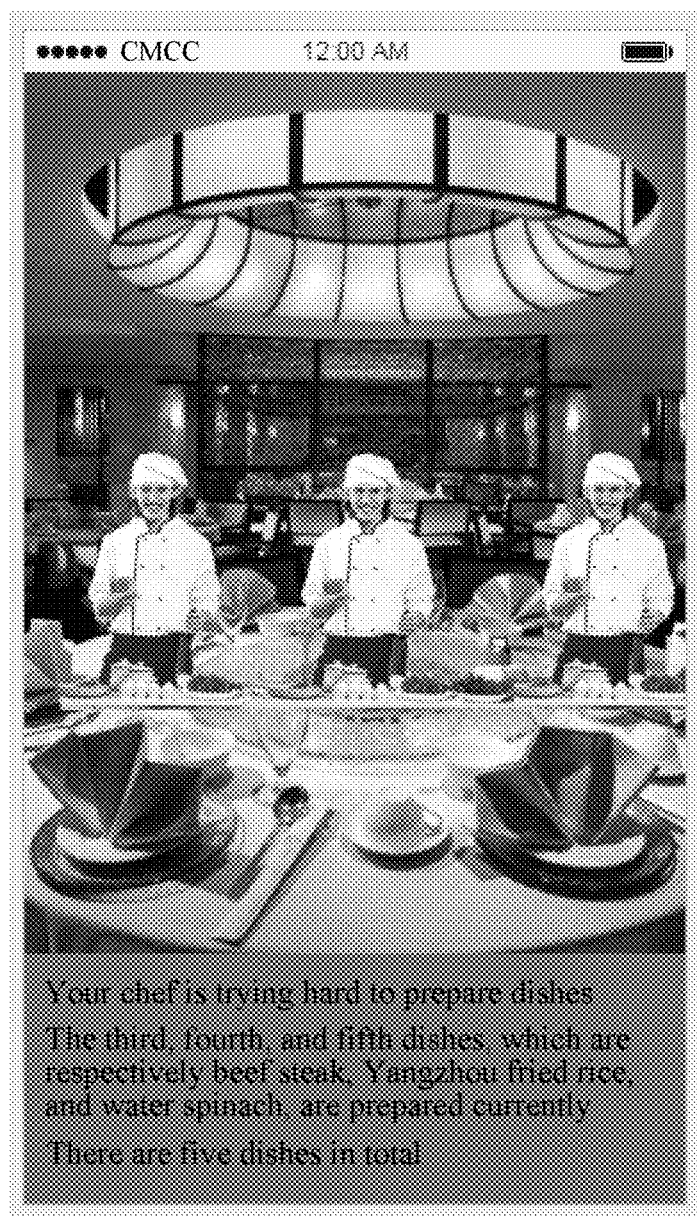
FIG. 9 is an illustration of an interface for displaying a preparing status of a menu according to another embodiment.

FIG. 9 illustrates an example of an interface for displaying a preparing status of an order by the client. In the interface, there are three real-time images showing processes of preparing dishes by three chefs. The user may switch between the several real-time images by swiping on a screen or by using another operation manner.

In this example, an order is a menu and an ordered item is a dish. In addition, the client is a restaurant end, the central site remains unchanged, and the backend is a kitchen end. In this embodiment, an example of a process of ordering dishes at a target dining table and waiting for the dishes is used to describe a menu processing method.

Figure 10:
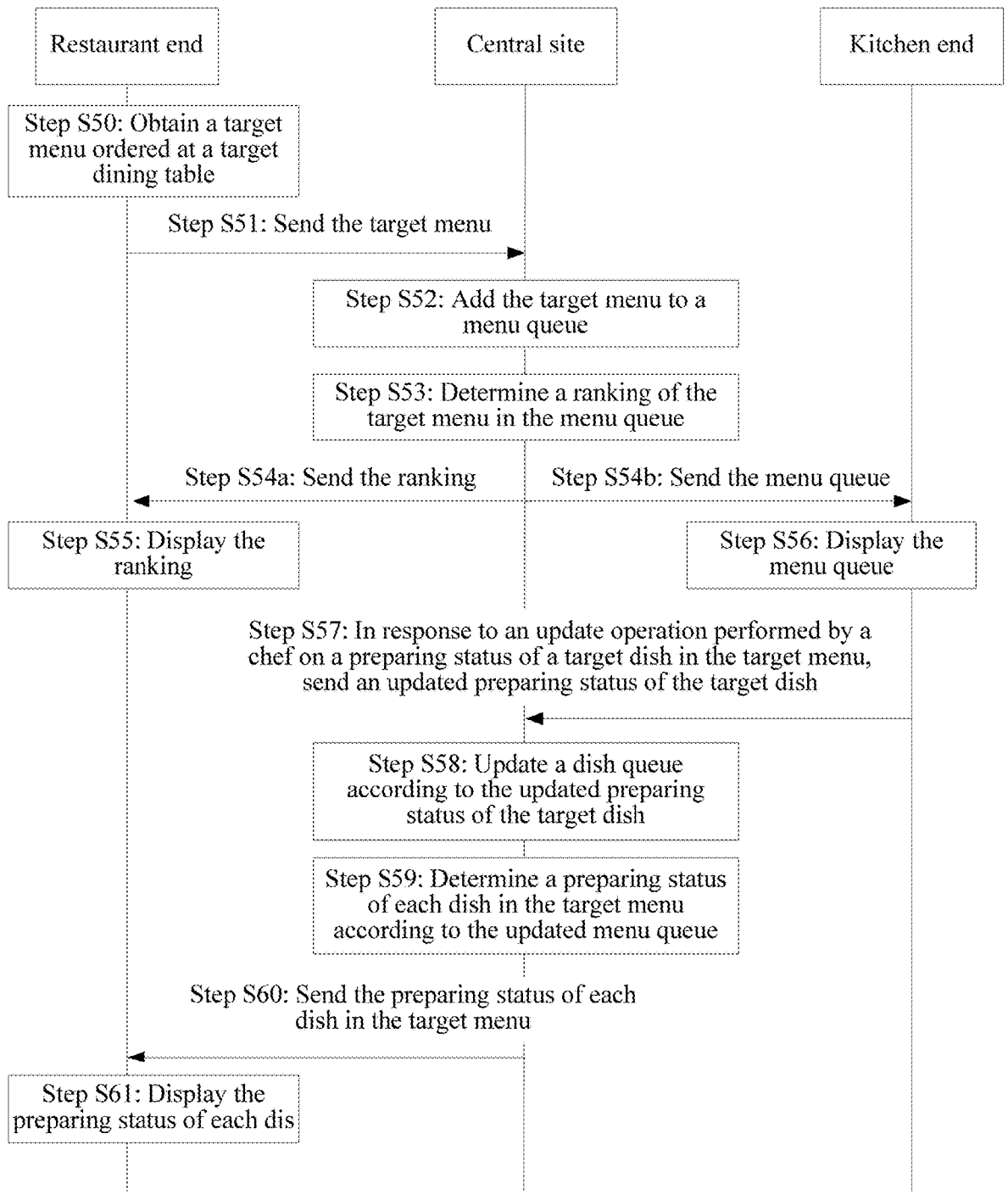
FIG. 10 is a flowchart of a menu processing method according to another embodiment.

Referring to FIG. 10, in step S50 the restaurant end obtains a target menu ordered at the target dining table.

The restaurant end may obtain information obtained by scanning a preset figure, and the information obtained through scanning includes a dining table number.

The information obtained through scanning may further include a restaurant ID. Information about the preset figure may be set on the dining table, and the information about the preset figure may be a two-dimensional code. The restaurant end scans the two-dimensional code on the dining table associated with the restaurant end to obtain a dining table number for ordering dishes, as a delivery object of a menu.

In addition, one restaurant end may be preconfigured for each dining table, and a relationship between a restaurant end and a dining table number may be pre-established.

In step S51, the restaurant end sends the target menu to the central site, wherein the target menu identifies a delivery object, that is, a dining table number.

In step S52, the central site adds the target menu to a menu queue.

In step S53, the central site determines a ranking of the target menu in the menu queue.

In step S54a, the central site sends the ranking to a restaurant end associated with the target dining table.

In step S54b, the central site sends the menu queue to the kitchen end.

In step S55, the restaurant end displays the ranking. For example, FIG. 8 shows an illustration of the display interface of the restaurant end.

In step S56, the kitchen end displays the menu queue.

In step S57, in response to an update operation performed by a chef on a preparing status of a target dish in the target menu, the kitchen end sends an updated preparing status of the target dish to the central site.

The preparing statuses of a dish may include "waiting to be prepared," "being prepared," and "completely prepared." Each time when a preparing status of a dish is changed, the kitchen end sends a changed preparing status of the dish to the central site.

In the following steps, updating the preparing status of the target dish in the target menu is described.

In step S58, the central site updates a dish queue according to the updated preparing status of the target dish.

In step S59, the central site determines a preparing status of each dish in the target menu according to the updated menu queue.

In step S60, the central site sends a preparing status of each dish in the target menu to the restaurant end associated with the target dining table.

In step S61, the restaurant end displays the preparing status of each dish. For example, FIG. 5 shows an illustration of a display interface of the restaurant end.

In addition, a camera may be further configured to, for the kitchen end, record, in real time, a real-time image of preparing a dish by the chef, and send the real-time image to the central site. When determining that the first dish in the target menu starts to be prepared, the central site sends a real-time image to the restaurant and associated with the target dining table, and stops sending a real-time image to the restaurant end when determining that the last dish in the target menu is completely prepared. The restaurant end may further obtain a background video image by using the camera, and then superimpose the real-time image to the background video image for display, thereby improving user experience.

Figure 11:
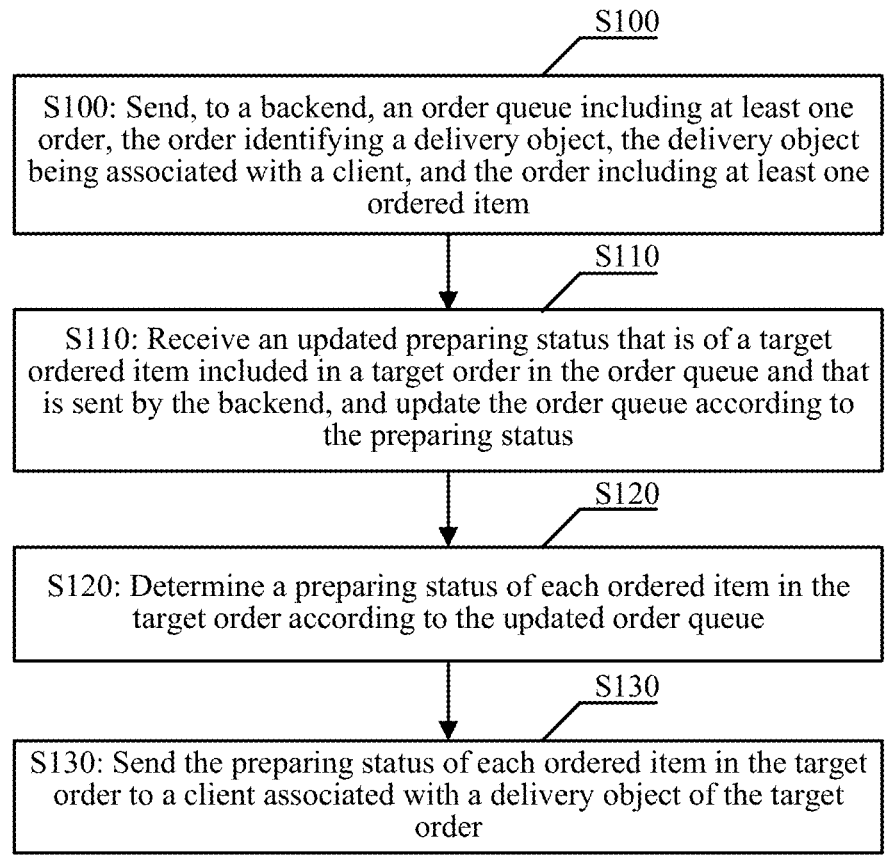
FIG. 11 is a flowchart of an order processing method from the perspective of a central site according to an embodiment.

In the following embodiment, an order processing method is described from the perspective of a central site. Referring to FIG. 11, in step S100, the central site sends, to a backend, an order queue including at least one order, the order identifying a delivery object, the delivery object being associated with a client, and the order including at least one ordered item.

The order queue is sent to the backend, to prompt a preparing object to prepare the ordered item in the order queue, and according to an update operation performed by the preparing object on a preparing status of a target ordered item in the order queue, the backend sends the updated preparing status of the target ordered item to the central site.

In step S110, the central site receives the updated preparing status of the target ordered item included in the target order in the order queue and updates the order queue according to the preparing status.

In step S120, the central site determines a preparing status of each ordered item in the target order according to the updated order queue.

In step S130, the central site sends the preparing status of each ordered item in the target order to a client associated with a delivery object of the target order.

According to the order processing method provided in this embodiment, the preparing status of each ordered item in the target order can be learned by a user that initiates the target order, thereby reducing anxiety of the user during the waiting period.

Based on the foregoing, the method may further include the following steps of (1) receiving an order sent by a client, where the order is delivered by a delivery object associated with the client and (2) adding the order to the order queue, and send the order queue to the backend.

Specifically, an order in an order queue stored by the central site may be obtained by the client and sent to the central site, thereby simplifying a procedure of obtaining the order by the central site.

Additionally, based on the foregoing, the method may further include (1) determining a ranking of the order in the order queue after the order is added to the order queue and (2) sending the ranking of the order to the client associated with the delivery object of the order, where the order queue is used to sequentially store orders that are already received by the central site and that are not completely prepared.

The ranking of the order in the order queue may be determined, and the ranking may be sent to a client associated with an object that initiates the order, so that the user learns of the ranking of the order in timely manner.

The method may further include (1) determining, after determining the preparing status of each ordered item in the target order to which the target ordered item belongs, whether the ordered items in the target order are all completely prepared, (2) if the ordered items in the target order are all completely prepared, deleting the target order from the order queue, and determining the newest rankings of orders in the order queue after the deletion, and (3) sending the newest rankings of the corresponding orders to clients associated with delivery objects of the orders.

Upon determining that the preparing status of the target ordered item is changed, the central site determines whether the ordered items in the target order to which the target ordered item belongs are all completely prepared. If the ordered items in the target order are all completely prepared, the central site identifies that the target order is completely prepared, deletes the target order from the order queue, determines the newest rankings of the orders in the order queue and sends the newest rankings of the corresponding orders to the clients associated with the delivery objects of the orders. Therefore, when the ranking of the order is changed, the user that initiates the order is notified in timely manner.

In another embodiment, the method may include (1) receiving a real-time image sent by the backend, where the real-time image is an image recorded in a process of preparing an ordered item by the preparing object and (2) upon determining that the target ordered item is the first ordered item in the target order and an updated preparing status of the target ordered item indicates that the target ordered item is starting to be prepared, sending the real-time image to the client associated with the delivery object of the target order, and stopping the sending when determining that the ordered items in the target order are all completely prepared.

The real-time image is sent to the client, so that after obtaining the background video image, the client may display the real-time image in the background video image by superimposing the real-time image, thereby improving user experience by reducing anxiety during the waiting period.

In addition, the user may use another wearable device to display the image on the client.

Figure 12:
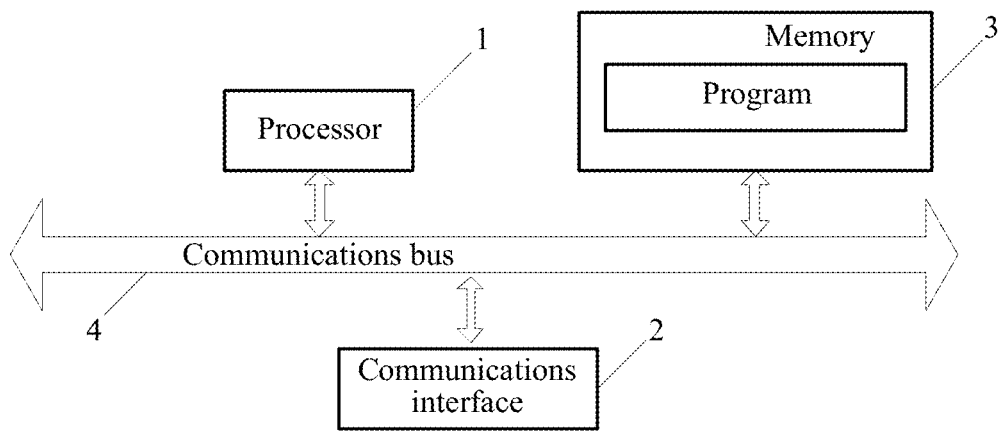
FIG. 12 is a block diagram of a hardware structure of a central site according to an embodiment.

FIG. 12 is a block diagram of a hardware structure of a central site. Referring to FIG. 12, the central site may include a processor 1, a communications interface 2, a memory 3, and a communications bus 4.

The processor 1, the communications interface 2, and the memory 3 may communicate to each other by using the communications bus 4.

The communications interface 2 may be an interface of a communications module, for example, an interface of a GSM module.

The processor 1 is configured to execute a program.

The memory 3 is configured to store the program.

The program may include program code and the program code may include computer operation instructions.

The processor 1 may be a central processing unit (CPU) or an application-specific integrated circuit (ASIC), or one or more integrated circuits configured to implement the embodiments herein.

The memory 3 may include a high speed random access memory (RAM) and may also include a non-volatile memory, such as magnetic disk storage.

The central site may be a server and the client may be a terminal device.

The embodiments in this specification are all described in a progressive manner. Description of each of the embodiments focuses on differences from other embodiments, and for same or similar parts in the embodiments, refer to these embodiments. The apparatuses disclosed in the embodiments correspond to the method disclosed in the embodiments and therefore are briefly described, and for the associated part, refer to the method.

A person skilled in the art may further realize that, the units and algorithm steps in the examples described with reference to the embodiments disclosed herein may be implemented by electronic hardware, computer software, or a combination thereof. To clearly describe the interchangeability between the hardware and the software, compositions and steps of each example have been generally described according to functions in the foregoing descriptions. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

The method and algorithm steps described with reference to the embodiments disclosed herein may be directly implemented by using hardware, a software module executed by a processor, or a combination thereof. The software module may reside in a RAM, a memory, a read-only memory (ROM), an electrically programmable ROM, an electrically erasable programmable ROM, a register, a hard disk, a removable disk, a CD-ROM, or any other form of storage medium known in the art.

All or some of the foregoing embodiments may be implemented by using software, hardware, firmware, or any combination thereof. When software is used to implement the embodiments, the embodiments may be implemented completely or partially in a form of a computer program product.

The computer program product includes one or more computer instructions. When the computer program instructions are loaded and executed on the computer, the procedure or functions described in the embodiments of the present invention are all or partially generated. The computer may be a general-purpose computer, a dedicated computer, a computer network, or other programmable apparatuses. The computer instructions may be stored in a computer readable storage medium or may be transmitted from a computer readable storage medium to another computer readable storage medium. For example, the computer instructions may be transmitted from a website, a computer, server, or a data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center integrating one or more usable media. The usable medium may be a magnetic medium (for example, a soft disk, a hard disk, or a magnetic tape), an optical medium (for example, a DVD), a semiconductor medium (for example, a Solid State Disk (SSD)), or the like.

The above description of the disclosed embodiments enables a person skilled in the art to implement or use this application. Various modifications to these embodiments are obvious to a person skilled in the art, and the general principles defined in this application may be implemented in other embodiments without departing from the spirit or scope of this application. Therefore, this application is not limited to these embodiments shown in this specification, but needs to conform to the broadest scope consistent with the principles and novel features disclosed in this specification.

What is claimed is:

1. An order processing system comprising:
a client;
a central site; and
a backend,
wherein the central site is configured to send, to the backend, an order queue comprising at least one order identifying a delivery object associated with the client the order comprising at least one ordered item,
the backend is configured to prompt a preparing object to prepare the at least one ordered item in the order queue, and in response to an update operation performed by the preparing object on a preparing status of a target ordered item in the order queue, send an updated preparing status of the target ordered item to the central site,
the central site is further configured to update the order queue according to the updated preparing status of the target ordered item, determine, according to the updated order queue, the preparing status of each target ordered item, and send the preparing status of each target ordered item to the client associated with the delivery object of the at least one order,
the client is configured to receive the updated preparing status of the ordered item and display the received preparing status of the ordered item,
the backend is further configured to obtain a real-time image of preparing the ordered item by the preparing object and send the real-time image to the central site,
the central site is further configured to receive the real-time image of preparing the ordered item from the backend, determine that the target ordered item is the first ordered item in the target order, update the preparing status of the target ordered item, determine that the target ordered item is starting to be prepared, send the real-time image to the client associated with the delivery object of the target order, and stop sending when determining that the ordered items in the target order are all completely prepared, and
the client is further configured to obtain a background video image, superimpose the received real-time image from the central site to the background video image, and display the superimposed image on the client.

2. The system according to claim 1, wherein the client is further configured to obtain the order delivered by the delivery object associated with the client, identify the delivery object as the delivery object of the order, and send the order to the central site, and
wherein the central site is further configured to add the order sent by the client to the order queue and send the order queue to the backend.

3. The system according to claim 2, wherein the central site is further configured to,
after adding the order sent by the client to the order queue, determine a ranking of the order in the order queue and send the ranking of the order to the client associated with the delivery object of the order, wherein the order queue is used to sequentially store orders that are received by the central site and that are not completely prepared.

4. The system according to claim 3, wherein the central site is further configured to, after determining the preparing status of each ordered item in the target order, determine whether the ordered items in the target order are all completely prepared; and if the ordered items in the target order are all completely prepared, delete the target order from the order queue, update the rankings of the ordered items in the order queue after the deletion and send the updated rankings of the corresponding orders to the clients associated with delivery objects of the orders.

5. The system according to claim 1, wherein the client further comprises:

a camera disposed on the client to capture a real-time video image as the background video image.

6. The system according to claim 1, wherein the background video image further comprises a prestored video image.

7. The system according to claim 1, wherein the backend obtains one or more real-time images when one or more preparing objects prepare one or more ordered items.

8. An order processing method for a central site, the method comprising:

sending, to a backend, an order queue comprising at least one order identifying a delivery object associated with a client, and the order comprising at least one ordered item;

receiving, from the backend, an updated preparing status of a target ordered item in the order queue;

updating the order queue based on the preparing status of the target ordered item;

determining the preparing status of each target ordered item in the order based on the updated order queue;

sending the preparing status of each ordered item to the client associated with the delivery object of the order;

receiving a real-time image sent by the backend, wherein the real-time image is an image recorded in a process of preparing the ordered item by the preparing object;

determining whether the updated preparing status of the target ordered item indicates the target ordered item is starting to be prepared;

sending, when the updated preparing status of the target ordered item indicates that the target ordered item is starting to be prepared, the real-time image to the client associated with the delivery object of the target order, and stopping sending when determining that the ordered items in the target order are all completely prepared;

obtaining a background video image; and superimposing the real-time image to the background video image for display to the client.

9. The method according to claim 8, further comprising:

receiving the order sent by the client, wherein the order is delivered by the delivery object associated with the client; and adding the order to the order queue and sending the order queue to the backend.

10. The method according to claim 9, further comprising:

determining a ranking of the order in the order queue after the order is added to the order queue; and sending the ranking of the order to the client associated with the delivery object of the order, wherein the order queue is used to sequentially store orders that are received by the central site and that are not completely prepared.

11. The method according to claim 10, further comprising:

determining, after receiving the preparing status of each ordered item in the target order from the backend, whether the ordered items in the target order are all completely prepared;

deleting the target order that are all completely prepared from the order queue and updating rankings of orders in the order queue; and sending the updated rankings of the corresponding orders to clients associated with delivery objects of the orders.

12. The method according to claim 11, further comprising:

displaying, in the background video image, the updated ranking of the order sent by the central site.

13. The method according to claim 12, wherein the obtaining the background video image comprises:

controlling a camera disposed on the client to be enabled, and obtaining a real-time video image captured by the camera, as the background video image.

14. The method according to claim 12, wherein the obtaining the background video image comprises:

obtaining a prestored video image, as the background video image.

15. The method according to claim 8, wherein the superimposing the real-time image to the background video image for display comprises:

superimposing, to the background video image, one or more real-time images if the backend obtains one or more real-time images of different preparing objects preparing different ordered items, and switching between the one or more real-time images based on a user command.

16. A non-transitory computer-readable storage medium storing program instructions that cause at least one processor configured to:

send, to a backend, an order queue comprising at least one order, the order identifying a delivery object associated with a client, the order and comprising at least one ordered item;

receive, from the backend, an updated preparing status of a target ordered item in the order queue sent by the backend;

update the order queue based on the preparing status of the target ordered item;

determine the preparing status of each target ordered item in the order based on the updated order queue;

send the preparing status of each ordered item in the order to the client associated with the delivery object of the target order;

receive a real-time image sent by the backend, wherein the real-time image is an image recorded in a process of preparing the ordered item by the preparing object;

determine whether the updated preparing status of the target ordered item indicates the target ordered item is starting to be prepared;

send, when the updated preparing status of the target ordered item indicates that the target ordered item is starting to be prepared, the real-time image to the client associated with the delivery object of the target order, and stopping sending when determining that the ordered items in the target order are all completely prepared;

obtain a background video image; and superimpose the real-time image to the background video image for display to the client.

* * * * *